US011145425B2

(12) United States Patent
Lahoda et al.

(10) Patent No.: US 11,145,425 B2
(45) Date of Patent: Oct. 12, 2021

(54) GRAIN BOUNDARY ENHANCED UN AND U3SI2 PELLETS WITH IMPROVED OXIDATION RESISTANCE

(71) Applicant: WESTINGHOUSE ELECTRIC COMPANY LLC, Cranberry Township, PA (US)

(72) Inventors: Edward J. Lahoda, Edgewood, PA (US); Peng Xu, Columbia, SC (US); Robert L. Oelrich, Jr., Columbia, SC (US); Hemant Shah, Columbia, SC (US); Jonathan Wright, Vasteras (SE); Lu Cai, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 254 days.

(21) Appl. No.: 16/260,889

(22) Filed: Jan. 29, 2019

(65) Prior Publication Data

US 2019/0237206 A1    Aug. 1, 2019

Related U.S. Application Data

(60) Provisional application No. 62/623,621, filed on Jan. 30, 2018, provisional application No. 62/655,421, filed on Apr. 10, 2018.

(51) Int. Cl.
*G21C 3/62* (2006.01)
*G21C 21/12* (2006.01)
(Continued)

(52) U.S. Cl.
CPC .............. *G21C 3/626* (2013.01); *G21C 3/045* (2019.01); *G21C 3/62* (2013.01); *G21C 21/12* (2013.01); *G21C 3/22* (2013.01)

(58) Field of Classification Search
CPC .......... G21C 3/626; G21C 3/62; G21C 3/045; G21C 3/22; G21C 3/623; G21C 21/12;
(Continued)

(56) References Cited

U.S. PATENT DOCUMENTS 3,290,223 A * 12/1966 Blocher, Jr. ............ G21C 3/626
                                                                                           376/411
5,429,775 A     7/1995   Hirai et al.
(Continued)

FOREIGN PATENT DOCUMENTS

EP          1193717 A1 *   4/2002   ............. G21C 3/623
JP        2011033504 A      2/2011

OTHER PUBLICATIONS (2012) "Visual Elements Periodic Table", Royal Society of Chemistry, downloaded on Jun. 2, 2012 from https://www.rsc.org/periodic-table/element/42/molybdenum (Year: 2012).*
(Continued)

*Primary Examiner* — Darlene M Ritchie
(74) *Attorney, Agent, or Firm* — K&L Gates LLP

(57) ABSTRACT

A method of forming a water resistant boundary on a fissile material for use in a water cooled nuclear reactor is described. The method comprises mixing a powdered fissile material selected from the group consisting of UN and $U_3Si_2$ with an additive selected from oxidation resistant materials having a melting or softening point lower than the sintering temperature of the fissile material, pressing the mixed fissile and additive materials into a pellet, sintering the pellet to a temperature greater than the melting point of the additive. Alternatively, if the melting point of the oxidation resistant particles is greater than the sintering temperature of UN or $U_3Si_2$, then the oxidation resistant particles can have a particle size distribution less than that of the UN or $U_3Si_2$.

12 Claims, 1 Drawing Sheet

A

B

(51) Int. Cl.
*G21C 3/04* (2006.01)
*G21C 3/22* (2006.01)

(58) Field of Classification Search
CPC . G21C 21/02; Y02E 30/30; B22F 2003/1042;
B22F 2003/145; B22F 2007/047; B22F
2202/06; B22F 2301/40; B22F 2301/45;
B22F 2302/45; B22F 2302/25; B22F
2302/00; B22F 2303/20; B22F 2303/30;
B22F 2303/35; B22F 1/02; B22F 1/0003;
B22F 1/025; B22F 1/00; B22F 3/15;
B22F 3/11; B22F 3/12; B22F 3/1208;
B22F 3/105; B22F 3/1035; B22F 3/10;
B22F 3/03; B22F 3/02; B22F 3/004;
B22F 3/00; B22F 7/002; B22F 7/04;
B22F 7/00
USPC .............................. 252/636; 264/0.5; 427/5
See application file for complete search history.

(56) References Cited

U.S. PATENT DOCUMENTS

| | | | |
|---|---|---|---|
| 2008/0240334 A1 | 10/2008 | Senor et al. | |
| 2011/0206174 A1 | 8/2011 | Hallstadius et al. | |
| 2013/0223582 A1 | 8/2013 | Rhee et al. | |
| 2015/0063524 A1* | 3/2015 | Yacout | C23C 16/45555 376/417 |
| 2017/0200517 A1* | 7/2017 | Venneri | G21C 3/044 |

OTHER PUBLICATIONS

Randall M. German et al.; Review: liquid phase sintering; J. Mater Sci (2009) 44:1-39, article, Published Dec. 11, 2008; Springer Science + Business Media, LLC.

Kyle Johnson et al.; Oxidation of accident tolerant fuel candidates; article, Journal of Nuclear Science and Technology, 54:3, 280-286, DOI: 10.1080/00223131.2016.1262297; Published Dec. 5, 2016.

Denise Adorno Lopes, et al.; Degradation of UN and UN-U3Si2 pellets in steam environment; article,Journal of Nuclear Science and Technology, 54:4, 404-413, DOI: 10.1080/00223131.2016.1274689, Published Jan. 9, 2017.

R.M. Dell, et al., Hydrolysis of Uranium Mononitride, article published Jan. 1, 1967; http://pubs.rsc.org/doi:10.1039/TF9676301286; pp. 1286-1294.

N.J. Bridger, et al.; The Oxidation and Hydrolysis of Uranium and Plutonium Nitrides; article, Reactivity of solids; proceedings; (1969) pp. 389-400.

J. E. Antill, et al.; Kinetics of the oxidation of UN and U(CO) in Carbon Dioxide, Steam and Water at Elevated Temperatures; Corrosion Science, 1966, vol. 6, pp. 17 to 23, Perganon Press Ltd. Great Britain.

J.L. Snelgrove, et al.; Qualification of Uranium-Molybdenum Alloy Fuel—Conclusions of an International Workshop; article submitted for presentation at Proceedings of the 4th International Topical meeting on Research Reactor Fuel Management, Colmar, France; Mar. 19-21, 2000.

E. Sooby Wood, et al.; U3Si2 Behavior in H2O: Part I, Flowing Steam and the Effect of Hydrogen; Journal of Nuclear Materials; Dec. 12, 2017, pp. 1-27.

A.T. Nelson et al.; U3Si2 Behavior in H2O Environments: Part II, Pressurized Water with Controlled Redox Chemistry; Journal of Nuclear Materials 500 (2018) 81-91; Published Dec. 16, 2017.

E. Sooby Wood, et al.; Oxidation behavior of U-Si compounds in air from 25 to 1000 C; Journal of Nuclear Materials 484 (2017) 245-257; Elsevier.

Heinz U. Kessel, et al.; "FAST" field assisted sintering technology—a new process for the production of metallic and ceramic sintering materials; pp. 1-37.

International Search Report and Written Opinion of the International Searching Authority for PCT/US2919/015618.

* cited by examiner

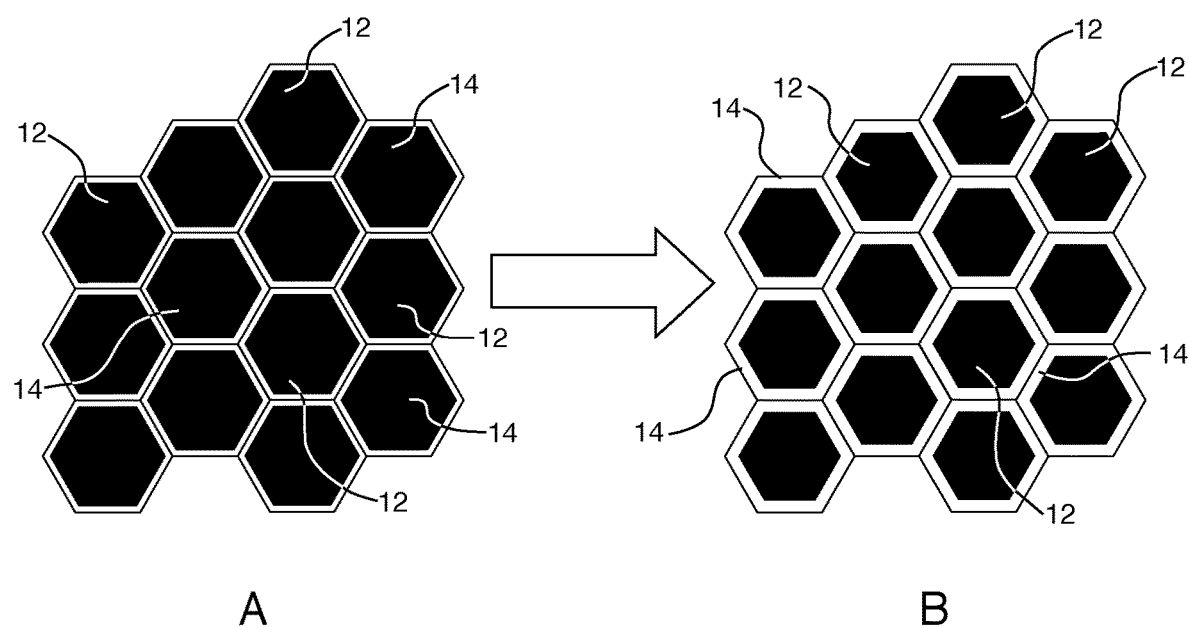

GRAIN BOUNDARY ENHANCED UN AND U3SI2 PELLETS WITH IMPROVED OXIDATION RESISTANCE

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The invention relates to fuels for nuclear reactors, and more particularly to methods of improving corrosion resistance of nuclear fuels.

2. Description of the Prior Art

Enhancing the safety and performance of light water reactors is an ongoing subject of research. Uranium Nitride (UN) and Uranium Silicide ($U_3Si_2$) fuels have been selected as the leading candidates for advanced light water reactor fuel due to their high thermal conductivity and density. One of the major weaknesses for UN fuel, however, is its interaction with water and steam at normal operating conditions and high temperatures. The reaction of $U_3Si_2$ with water and steam is less severe than UN but any improvement is beneficial. It has been reported in the literature that the grain boundaries of UN and $U_3Si_2$ are preferentially attacked when exposed to water or steam and appear to be the major cause for rapid reaction and disintegration of these fissile materials.

UN and $U_3Si_2$ are fuels with much improved thermal conductivity and density compared to most fuel types. If the water and steam corrosion resistance problem can be solved for UN and $U_3Si_2$, it will become a much more attractive accident tolerant fuel pellet.

SUMMARY OF THE INVENTION

A method for adding additives or dopants to Uranium Nitride (UN) and Uranium Silicide ($U_3Si_2$) pellets to improve their water corrosion resistance in nuclear reactor coolant during operation and in high temperature steam in loss of coolant accidents conditions is described. It is found that UN pellets have minimal oxidation resistance in water and steam even at 200° C. $U_3Si_2$ has better oxidation resistance than UN but still reacts with air, water, or steam at temperatures higher than 360° C. See E. Sooby Wood, et. al, "Oxidation behavior of U—Si compounds in air from 25 to 1000° C.", *Journal of Nuclear Materials*, 484 (2016) pp. 245-257.

A method for improving corrosion resistance of nuclear fuels is described herein which includes mixing a powdered fissile material selected from the group consisting of UN and $U_3Si_2$ with an additive selected from oxidation resistant materials wherein the powdered fissile material comprises grains having grain boundaries, pressing the mixed fissile and additive materials into a pellet, and sintering the pellet to a temperature greater than the melting point of the additive, sufficient for melting the additive for coating the grain boundaries of the fissile material and densifying the pellet. The additive selected may also have a median particle size significantly lower than the median particle size of the UN or $U_3Si_2$ while having a melting point greater than the UN or. In various aspects, the oxidation resistant additive may have a melting point lower than the sintering temperature of the fissile material. In various aspects, when the melting point of the oxidation resistant additive is greater than the sintering temperature of UN or $U_3Si_2$, the oxidation resistant particles can have a median particle size less than 10% that of the UN or $U_3Si_2$.

By the method described herein, small amounts of oxidation resistant compound(s) (less than 20 wt %) are incorporated into the fissile material, (i.e., UN and $U_3Si_2$) at the grain boundaries of the material and thus achieve improved oxidation resistance. The additives may be in powder form and may be added or mixed with $U_3Si_2$ or UN powders before pressing into pellets and sintering. The additives may be coated to the $U_3Si_2$ or UN powders to form protective layers before pressing into pellets and sintering. The oxidation resistant particles may also be applied through vapor deposition (such as physical vapor deposition, chemical vapor deposition, and atomic layer deposition) to green (unsintered) pellets of UN or $U_3Si_2$ to coat the outside of the pellet and penetrate into the green pellet as the green pellet has a lot of open pores/channel through the pellet. Upon sintering, the oxidation resistant material will be incorporated into the outside grain structure (grain boundary) of the UN or $U_3Si_2$.

In certain aspects, the additives include one or a mixture of molybdenum, titanium, aluminum, chromium, thorium, copper, nickel, manganese, tungsten, niobium, zirconium, yttrium, cerium, magnesium, alloys containing at least 50 atomic % of at least one of molybdenum, titanium, aluminum, chromium, thorium, copper, nickel, manganese, tungsten, niobium, zirconium, yttrium, cerium, and magnesium, magnesium nitride, $ZrSi_2$, $ZrSiO_4$, $CrSi_2$, BeO, and $UO_2$ and glassy materials, such as a borosilicate glass. Either the additive or mixture of additives to be mixed with the fissile material has a lower melting point than UN or $U_3Si_2$ or, the additive or mixture of additives and the nuclear fuel form low melting point eutectics.

In various aspects, densification is achieved via liquid phase sintering or co-sintering. Pellets can be sintered, for example, by using sintering methods selected from the group consisting of pressureless sintering, hot pressing, hot isostatic pressing, spark plasma sintering, field assisted sintering, or flash sintering. Those skilled in the art will recognize that any suitable known sintering method may be used.

Also described herein is a nuclear fuel comprising a pellet comprised of compressed and densified grains of a fissile material selected from the group consisting of UN and $U_3Si_2$, and an oxidation resistant additive, preferably present in amounts less than about 20% by weight of the fissile material, that coats at least a portion of the grain boundaries of the fissile material. In certain aspects, the additives include one or a mixture of molybdenum, titanium, aluminum, chromium, thorium, copper, nickel, manganese, tungsten, niobium, zirconium, yttrium, cerium, magnesium, alloys containing at least 50 atomic % of at least one of molybdenum, titanium, aluminum, chromium, thorium, copper, nickel, manganese, tungsten, niobium, zirconium, yttrium, cerium, and magnesium, magnesium nitride, $ZrSi_2$, $ZrSiO_4$, $CrSi_2$, BeO, and $UO_2$ and glassy materials, such as a borosilicate glass.

BRIEF DESCRIPTION OF THE DRAWINGS

The characteristics and advantages of the present disclosure may be better understood by reference to the accompanying FIGURE.

Part A of the FIGURE illustrates schematically the grain boundaries of the fissile material.

Part B illustrates an ideal case of secondary phase coverage of the grains.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Methods are described herein for increasing the oxidation resistance of the grain boundaries of fissile materials, such as UN and $U_3Si_2$ nuclear fuels, so that interactions with water or steam can be suppressed and the washout of fuel pellets can be minimized should a leak in the fuel rod occur.

Improving the oxidation resistance of the grain boundaries will improve the resistance to the oxidation reaction and the resulting fragmentation as the less dense $UO_2$ is formed, which is the key degradation mechanism when $U_3Si_2$ and UN are exposed to water or steam at higher temperatures. The grain boundary modification could be the most effective method to improve the corrosion and oxidation resistance of high density fuels like $U_3Si_2$ and UN.

A method for improving the oxidation resistance of the grain boundaries and improving the corrosion resistance of nuclear fuels is described herein. The method includes mixing a powdered fissile material selected from the group consisting of UN and $U_3Si_2$ with an additive selected from oxidation resistant materials. In various aspects, the additives may have a melting point lower than the sintering temperature of the fissile material. The mixture is pressed into a pellet, then sintered to a temperature greater than the melting point of the additive. As the additive melts, it flows around the still solid grains of the fissile material, coating the grain boundaries of the fissile material and densifying the pellet. In various aspects, when the melting point of the oxidation resistant particles is greater than the sintering temperature of UN or $U_3Si_2$, the oxidation resistant particles can have a median particle size less than 10% that of the UN or $U_3Si_2$. In certain aspects, the additives may be coated to the $U_3Si_2$ or UN powders to form protective layers before pressing into pellets and sintering. The oxidation resistant particles may also be applied through vapor deposition (such as physical vapor deposition, chemical vapor deposition, and atomic layer deposition) to green (unsintered) pellets of UN or $U_3Si_2$ to coat the outside of the pellet and penetrate into the green pellet as the green pellet has a lot of open pores/channels through the pellet. Upon sintering, the oxidation resistant material will be incorporated into the outside grain structure (grain boundary) of the UN or $U_3Si_2$ pellets.

The additives distributed along grain boundaries may stop fission gas releases from the $U_3Si_2$ grains such as Xe and Kr, as well as volatile fission products like Iodine. This will result in lower rod internal pressure which improves operating margins and the dry storage. In addition to oxidation resistance, the corrosion resistance phase will also prevent $U_3Si_2$ from interacting with cladding, plenum spring, and other rod internal components such as spacers which separate $U_3Si_2$ from end plug and plenum springs.

The additives may be in powder form and may be added or mixed with $U_3Si_2$ or UN powders before pressing into pellets and sintering. The additives may be coated to the $U_3Si_2$ or UN powders to form protective layers before pressing into pellets and sintering. The desired characteristics of the additive are that it is an oxidation resistant material and that it has a melting point lower than the melting point of the fissile material, either UN or $U_3Si_2$, with which it is mixed; and in various aspects, at least 200° C., and in certain aspects, from 200 to 300° C. lower than the sintering temperature of the fissile material. Alternatively, if the melting point of the oxidation resistant particles is greater than the sintering point of UN or $U_3Si_2$, then the oxidation resistant particles can have a median particle size less than 10% that of the UN or $U_3Si_2$, and in certain aspects, a median particle size less than 1% that of the UN or $U_3Si_2$.

In certain aspects, exemplary additives include one or a mixture of molybdenum, titanium, aluminum, chromium, thorium, copper, nickel, manganese, tungsten, niobium, zirconium, yttrium, cerium, magnesium, alloys containing at least 50 atomic % of at least one of molybdenum, titanium, aluminum, chromium, thorium, copper, nickel, manganese, tungsten, niobium, zirconium, yttrium, cerium, and magnesium, magnesium nitride, $ZrSi_2$, $ZrSiO_4$, $CrSi_2$, BeO, and $UO_2$ and glassy materials, such as a borosilicate glass. Either (1) the additive or the mixture of additives have lower melting points than the fissile material (UN or $U_3Si_2$) with which it is mixed or (2) the additive or the mixture of additives and the nuclear fuel form low melting point eutectics. For example, the fissile material may be UN and may be mixed with BeO as the additive. BeO has a melting point lower than the sintering temperature of UN. Those skilled in the art will be able to determine the melting points or sintering temperatures of the fissile material and the melting points of the oxidative resistant additives, or determine the melting point eutectics of the selected fissile material and additive, and select, according to the method described herein, the appropriate additive or mixture of additives for mixing with either UN or $U_3Si_2$.

The fuel and additive mixture may be formed into pellets by compressing the mixture of particles in suitable commercially available mechanical or hydraulic presses to achieve the desired "green" density and strength.

A basic press may incorporate a die platen with single action capability while the most complex styles have multiple moving platens to form "multi-level" parts. Presses are available in a wide range of tonnage capability. The tonnage required to press powder into the desired compact pellet shape is determined by multiplying the projected surface area of the part by a load factor determined by the compressibility characteristics of the powder.

To begin the process, the mixture of particles is filled into a die. The rate of die filling is based largely on the flowability of the particles. Once the die is filled, a punch moves towards the particles. The punch applies pressure to the particles, compacting them to the geometry of the die. In certain pelleting processes, the particles may be fed into a die and pressed biaxially into cylindrical pellets using a load of several hundred MPa.

Following compression, the oxidation resistant particles may also be applied through vapor deposition (such as physical vapor deposition, chemical vapor deposition, and atomic layer deposition) to the green (unsintered) pellets of UN or $U_3Si_2$ to coat the outside of the pellet and penetrate into the green pellet as the green pellet has a lot of open pores/channel through the pellet. The pellets are sintered by heating in a furnace at temperatures varying with the material being sintered under a controlled atmosphere, usually comprised of argon. Sintering is a thermal process that consolidates the green pellets by converting the mechanical bonds of the particles formed during compression into stronger bonds and greatly strengthened pellets. Upon sintering, the oxidation resistant material will be incorporated into the outside grain structure (grain boundary) of the UN or $U_3Si_2$ pellets. The compressed and sintered pellets are then cooled and machined to the desired dimensions. Exemplary pellets may be about one centimeter, or slightly less, in diameter, and one centimeter, or slightly more, in length.

Referring to the FIGURE, the hexagons in Part A represent grains of UN or $U_3Si_2$ fuel 12 with grains of an additive 14 mixed with the UN or $U_3Si_2$ fuel grains 12. As sintering proceeds and the temperature reaches and, in various aspects, surpasses the melting or softening point of the additive, the additive 14 melts or softens, and as shown in Part B of the FIGURE, flows about the mixture, coating all or at least a portion of the UN or $U_3Si_2$ fuel grains 12 on the grain boundaries. If the additive has a higher melting point than the sintering temperature of $U_3Si_2$ or UN, the fine particles are sintered into the grain boundaries of the larger $U_3Si_2$ or UN grains. The fuel 12 grain boundary coverage by the additive 14 in the FIGURE is an ideal case, and the actual coverage may be lower. It is preferred that the additive phase is interconnected.

In various aspects, densification is achieved via liquid phase sintering or co-sintering. Pellets can be sintered, for example, by using sintering methods selected from the group consisting of liquid phase sintering, pressureless sintering, hot pressing, hot isostatic pressing, spark plasma sintering, sometimes referred to as field assisted sintering or pulsed electric current sintering. Those skilled in the art will recognize that any suitable known sintering method may be used.

In a typical sintering process for producing nuclear fuel pellets, the pressed powder pellets are heated so that adjacent grains fuse together, producing a solid fuel pellet with improved mechanical strength compared to the pressed powder pellet. This "fusing" of grains results in an increase in the density of the pellet. Therefore, the process is sometimes called densification. In hot isostatic pressing, the compaction and sintering processes are combined into a single step.

In various aspects, the sintering may be done by a liquid phase sintering and co-sintering processes, both advanced processing technologies which have not heretofore been used in nuclear fuel manufacturing.

In liquid phase sintering, the solid grains are insoluble in the liquid so the liquid phase can wet on the solid phase. This insolubility causes the liquid phase to wet the solid, providing a capillary force that pulls the grains together. At the same time, the high temperature softens the solid, further assisting densification. During heating, the particles sinter. The solid grains rearrange when a melt forms and spreads. Subsequent densification is accompanied by coarsening. The liquid wets and penetrates between the solid grains. See German, R. M., Sun, P. & Park, S. J., *J Mater Sci* (2009) 44: 1. https://doi.org/10.1007/s10853-008-3008-0.

In various aspects, the sintering process may be done using spark plasma sintering, wherein external pressure and an electric field are applied simultaneously to enhance the densification of the pressed powder pellets. A pulsed DC current directly passes through the die, as well as the powder compact. The electric field driven densification supplements sintering with a form of hot pressing, to enable lower temperatures and shorter amount of time than typical sintering. The heat generation is internal, in contrast to the conventional hot pressing, where the heat is provided by external heating elements.

Pressureless sintering is a well-known sintering method involving the sintering of a powder compact (sometimes at very high temperatures, depending on the powder) without applied pressure. This avoids density variations in the final pellet, which occurs with more traditional hot pressing methods.

In another aspect, the sintering may be done by hot isostatic pressing. In this techniques, powders are usually encapsulated in a metallic or glass container. The container is evacuated, the powder out-gassed to avoid contamination of the materials by any residual gas during the consolidation stage and sealed-off. It is then heated and subjected to isostatic pressure sufficient to plastically deform both the container and the powder.

The rate of densification of the powder depends upon the yield strength of the powder at the temperatures and pressures chosen. At moderate temperature the yield strength of the powder can still be high and require high pressure to produce densification in an economic time.

The method produces a nuclear fuel comprising a pellet comprised of compressed and densified grains of a fissile material selected from the group consisting of UN and $U_3Si_2$, and an oxidation resistant additive, preferably present in amounts less than about 20% by weight of the fissile material, that coats at least a portion of the grain boundaries of the fissile material. In certain aspects, the additives include one or a mixture of molybdenum, titanium, aluminum, chromium, thorium, copper, nickel, manganese, tungsten, niobium, zirconium, yttrium, cerium, magnesium, alloys containing at least 50 atomic % of at least one of molybdenum, titanium, aluminum, chromium, thorium, copper, nickel, manganese, tungsten, niobium, zirconium, yttrium, cerium, and magnesium, magnesium nitride, $ZrSi_2$, $ZrSiO_4$, $CrSi_2$, BeO, and $UO_2$ and glassy materials, such as a borosilicate glass.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method comprising:
    mixing a powdered fissile material selected from the group consisting of UN and $U_3Si_2$ with an additive selected from oxidation resistant materials, the powdered fissile material comprising grains having grain boundaries;
    pressing the mixed fissile and the additive into a pellet; and,
    sintering the pellet to a temperature greater than the melting point of the additive sufficient for melting of the additive into the grain boundaries of the fissile material and densifying the pellet,
    wherein the additive has a melting point greater than the sintering temperature of the fissile material, and has a median particle size less than that of the UN or $U_3Si_2$.

2. The method recited in claim 1 wherein the powdered fissile material is UN, and the additive is selected from the group consisting of tungsten and alloys containing at least 50 atomic % thereof, and $UO_2$.

3. The method recited in claim 1 wherein the additive is present in amounts less than 20 weight percent of the fissile material.

4. The method recited in claim 1 wherein the sintering is selected from the group consisting of pressureless sintering, hot pressing, hot isostatic pressing, spark plasma sintering, field assisted sintering, and flash sintering.

5. The method recited in claim 1 wherein the median particle size of the additive is less than 10% of the median particle size of the UN or $U_3Si_2$.

6. The method recited in claim 1 wherein the median particle size of the additive is less than 1% of the median particle size of the UN or $U_3Si_2$.

7. The method recited in claim 1 wherein the vapor deposition is used to coat the outside of the unsintered pellet with the additive and to penetrate the additive into the pellet body of the UN or $U_3Si_2$.

8. The method recited in claim 1, wherein the powdered fissile material is $U_3Si_2$, and the additive is selected from the group consisting of molybdenum, titanium, chromium, thorium, tungsten, niobium, and zirconium, alloys containing at least 50 atomic % thereof, BeO, and $UO_2$.

9. The method recited in claim 1 wherein the additive coats to the $U_3Si_2$ or UN powders to form protective layers through vapor deposition before pressing into pellets and sintering.

10. The method recited in claim 9 wherein the vapor deposition is selected from the group consisting of physical vapor deposition, chemical vapor deposition, and atomic layer deposition.

11. A method comprising:
    mixing a powdered fissile material UN with an additive, the powdered fissile material comprising grains having grain boundaries;
    pressing the mixed fissile and the additive into a pellet; and
    sintering the pellet to a temperature greater than the melting point of the additive sufficient for melting of the additive into the grain boundaries of the fissile material and densifying the pellet,
    wherein the additive has a melting point lower than the sintering temperature of the fissile material, and the additive is a borosilicate glass.

12. A method comprising:
    mixing a powdered fissile material $U_3Si_2$ with an additive, the powdered fissile material comprising grains having grain boundaries;
    pressing the mixed fissile material and the additive into a pellet; and
    sintering the pellet to a temperature greater than the melting point of the additive sufficient for melting of the additive into the grain boundaries of the fissile material and densifying the pellet, wherein the additive has a melting point lower than the sintering temperature of the fissile material, and the additive is a borosilicate glass.

* * * * *